US011108702B1

(12) United States Patent
Twitchell et al.

(10) Patent No.: US 11,108,702 B1
(45) Date of Patent: Aug. 31, 2021

(54) CUSTOMIZED COMMAND EXECUTION FOR A COMPUTING RESOURCE FLEET

(71) Applicant: Amazon Technologies, Inc., Seattle, WA (US)

(72) Inventors: Steven Merlin Twitchell, Renton, WA (US); Amjad Hussain, Bellevue, WA (US); Sivaprasad Venkata Padisetty, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/838,050

(22) Filed: Dec. 11, 2017

(51) Int. Cl.
*H04L 12/911* (2013.01)
*G06F 9/455* (2018.01)

(52) U.S. Cl.
CPC ........ *H04L 47/783* (2013.01); *G06F 9/45558* (2013.01); *G06F 2009/45595* (2013.01)

(58) Field of Classification Search
CPC ..................... H04L 47/783; G06F 2009/45587
See application file for complete search history.

(56) References Cited

U.S. PATENT DOCUMENTS

| 9,710,307 | B1 | 7/2017 | Corley et al. |
| 10,142,174 | B2 | 11/2018 | Yang et al. |
| 2005/0050540 | A1 | 3/2005 | Shaughnessy et al. |
| 2009/0204470 | A1 | 8/2009 | Weyl et al. |
| 2011/0271145 | A1 | 11/2011 | Silberstein |
| 2011/0320605 | A1* | 12/2011 | Kramer ................... H04L 67/34 709/226 |
| 2012/0096468 | A1* | 4/2012 | Chakravorty ............. G06F 9/50 718/103 |
| 2014/0068734 | A1* | 3/2014 | Arroyo ............... G06F 21/6209 726/7 |
| 2014/0317218 | A1* | 10/2014 | Chiba ..................... H04L 43/50 709/208 |
| 2015/0220404 | A1 | 8/2015 | Borden et al. |
| 2015/0263900 | A1 | 9/2015 | Polyakov et al. |
| 2016/0344671 | A1* | 11/2016 | Hussain .................. G06F 9/546 |
| 2016/0359924 | A1* | 12/2016 | Roth ...................... H04L 63/126 |
| 2018/0285138 | A1* | 10/2018 | Jeong ...................... G06F 12/14 |
| 2019/0050301 | A1 | 2/2019 | Juniwal et al. |
| 2019/0079750 | A1 | 3/2019 | Foskett et al. |

* cited by examiner

*Primary Examiner* — Uzma Alam
*Assistant Examiner* — Sm Z Islam
(74) *Attorney, Agent, or Firm* — Davis Wright Tremaine LLP

(57) ABSTRACT

A virtual computer system management service receives input from a user specifying operations to be performed by a web-based service. The input includes an indication of a set of resources to be used to perform the operations and control information to control the set of resources to perform the operations. The virtual computer system management service configures the resources to perform the operations according to the control information. This causes the set of resources to perform the operations and provide a result. The virtual computer system management service provides this result to the user.

20 Claims, 8 Drawing Sheets

CUSTOMIZED COMMAND EXECUTION FOR A COMPUTING RESOURCE FLEET

BACKGROUND

Computing systems are used by businesses to perform various business-related tasks. As these businesses grow, the number and size of business-related tasks may become so large that it becomes impractical to perform the tasks using a single computer system. Therefore, some businesses distribute tasks to a collection of computer systems in a data center. In order to provide flexibility in resource management, the collection of computer systems are often implemented using a collection of virtual computer systems. However, the distribution of tasks to these virtual computer systems can be difficult, especially when such distribution is complex. Further, manual distribution of these tasks to the virtual computer systems by customers and other users may be tedious and prone to error.

BRIEF DESCRIPTION OF THE DRAWINGS

Various techniques will be described with reference to the drawings, in which.

DETAILED DESCRIPTION

Figure 1:
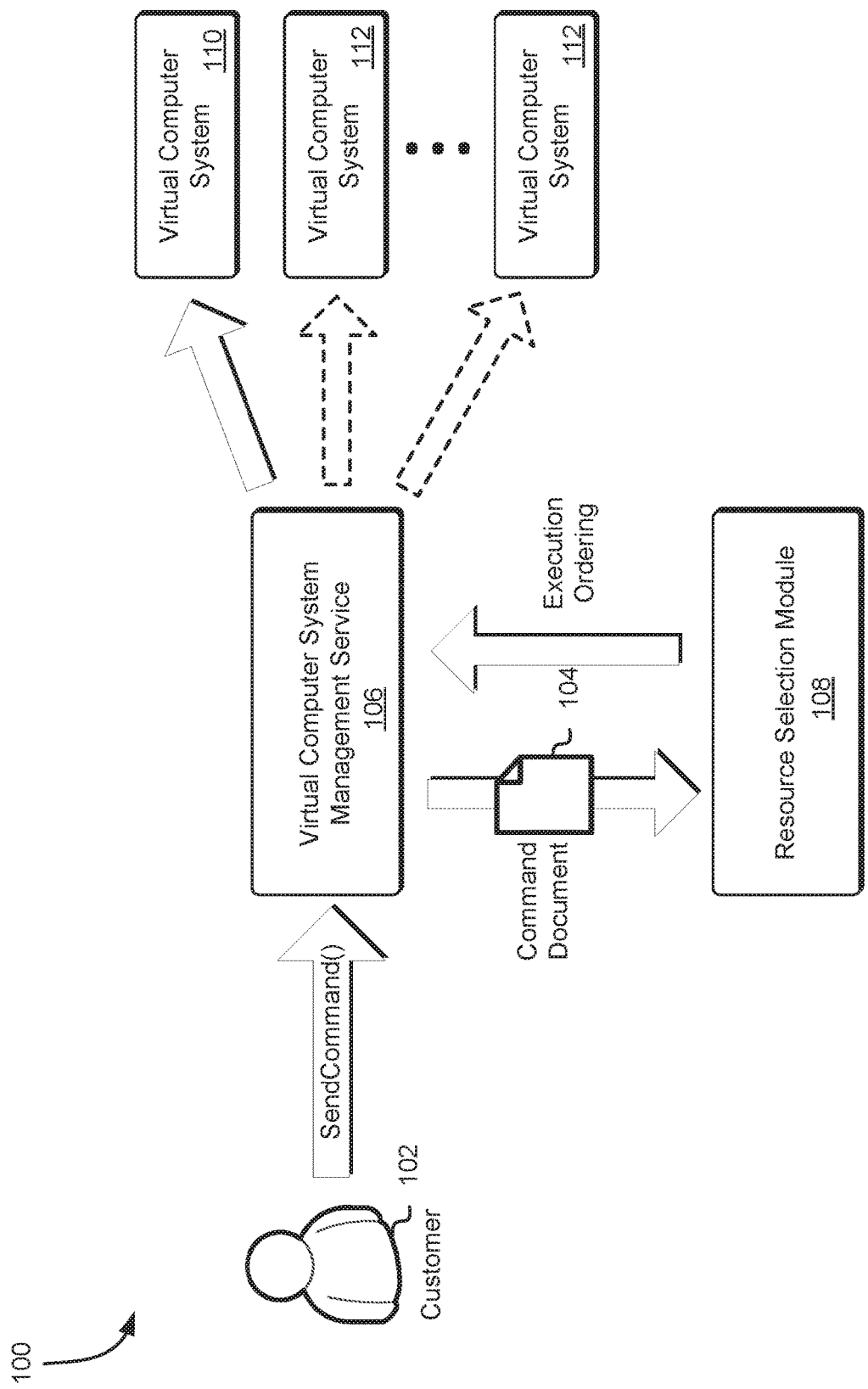
FIG. 1 shows an illustrative example of a system in which an embodiment can be implemented.

This disclosure relates to methods and techniques for enabling use of customized command execution strategies for executing commands across a fleet of virtual computer systems or other computing resources. In an embodiment, a virtual computer system management service receives a command document specifying a set of commands and configuration information applicable to virtual computer systems. In an embodiment, a configuration is a set of packages, updates, policies, or other settings that can be applied to a computer system or virtual computer system instance. In an embodiment, a configuration includes one or more configuration updates, such as a revision to an installed software package, an operating system update, a set of security policy changes, and/or a set of computing resource changes. In an embodiment, the command document specifies one or more limitations on execution of the commands. In an embodiment, the limitations include a velocity parameter that limits the number of computer system instances to which the configuration may be applied concurrently. In an embodiment, the limitations include an error threshold that stops the application of the configuration if the number of configuration failures meets or exceeds the error threshold. The command document, in an embodiment, is maintained by the virtual computer system management service and can be invoked by submitting an application programming interface (API) call to the service to transmit commands to the virtual computer systems in accordance with the command document.

In an embodiment, the virtual computer system management service receives an API call from a user to execute a set of commands using one or more virtual computer systems in accordance with the commands and configuration information specified in a command document. In an embodiment, the API call specifies an identifier corresponding to the command document to be executed, a query to select the target virtual computer systems on which the set of commands are to be executed, and an identifier corresponding to a resource selection module that provides an indication as to which virtual computer system is to execute the commands at a given time. In an embodiment, the API call further specifies code that corresponds to a strategy for execution of the commands and for an ordering in which the virtual computer systems are to be selected for execution of these commands. In an embodiment, the API call specifies an identifier corresponding to a resource selection module that can process the code and the command document to identify the next invocation target (e.g., virtual computer system) that is to execute the commands specified in the command document. In an embodiment, the resource selection module is provided by a customer of the virtual computer system management service. In an embodiment, the resource selection module is a virtual computer system instance or other computing resource capable of processing the code, such as a container including other executable code operating on a computing resource designated as a container instance to execute the code in the container. The code within the container, if executed, processes the code to perform the aforementioned identification.

In an embodiment, the virtual computer system management service provides the API call to a command processing application for execution of the commands in the specified command document. The command processing application transmits, to the resource selection module identified in the API call, an identifier corresponding to the command document and the code provided in the API call. The resource selection module processes the command document and the provided code to identify a first virtual computer system that is to execute the set of commands specified in the command document. In an embodiment, the resource selection module provides an invocation result specifying the identifier of the virtual computer system that is to execute the set of commands in the command document. In an embodiment, the command processing application transmits the set of commands to the identified virtual computer system for execution.

In an embodiment, the command processing application receives result code and the command output resulting from execution of the commands on the virtual computer system. In response to receiving the result code and command output from the virtual computer system, the command processing application transmits, to the resource selection module, the identifier corresponding to the resource selection module, the code from the API call, an identifier corresponding to the virtual computer system that provided the result code and command output, the number of virtual computer systems that have been sent the set of commands previously, and the number of virtual computer systems that have returned each result type (e.g., success, failure, execution timeout, unreachable, etc.). Based at least in part on the information provided by the command processing application, the resource selection module provides an invocation result that specifies the next virtual computer system that is to execute the set of commands. Alternatively, in an embodiment, the resource selection module provides a date-time after which the application can submit a request to the resource selection module again to obtain the next invocation result. This occurs if the code provided in the API call indicates a delay between invocations of virtual computer systems for execution of the commands. In an embodiment, the command processing application continues this process until the code specified in the API call is successfully executed or is interrupted due to error or other limitation.

In this manner, customers of a virtual computer system management service can provide custom strategies for execution of a set of commands across their fleet of virtual computer systems. Additionally, the techniques described and suggested herein facilitate additional technical advantages. For example, because a customer can specify, in the API call to the virtual computer system management service, customized code usable to identify which virtual computer systems are to be invoked for execution of commands, the customer can create arbitrary complex functions to control how commands are disseminated for execution. In an embodiment, these functions are used to limit possible instance failures while obviating the need to define specific fault isolation partitions or to submit numerous API calls to execute commands in accordance with the customer's strategy.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which an embodiment can be implemented. In the system 100, a customer 102 of a virtual computer system management service 106 submits a request to the virtual computer system management service 106 to cause a set of targeted virtual computer system instances to execute one or more commands specified in a command document 104. In an embodiment, the virtual computer system management service 106 provides a frontend interface to customers to enable the customer to submit requests to the virtual computer system management service 106. In an embodiment, the frontend interface is an API that is accessible to the customer 102. Further, the request from the customer 102, in an embodiment, is an API call (e.g., SendCommand( )) to the virtual computer system management service 106. This API call, in an embodiment, includes an identifier corresponding to a command document 104 that specifies the one or more commands or operations that can be executed by virtual computer system instances of the customer 102. In an embodiment, the API call specifies, instead of an identifier corresponding to the command document 104, the one or more commands or operations, a partly defined set of operations and information usable to identify pre-determined operations accessible to, and executable by, the resource selection module 108. In an embodiment, the API call specifies an identifier corresponding to operations from a set of operations that are performable by the resource selection module 108. In an embodiment, the commands include control information usable to control the virtual computer system instances or other computing resources.

In an embodiment, the API call further specifies one or more parameters usable to select a set of virtual computer system instances that are to execute the set of commands specified in the command document 104. In an embodiment, the API call specifies code that, if executed, is usable to implement a strategy for execution of the commands and for generating an ordering of the set of virtual computer system instances, as well as other conditions for selection of the virtual computer system instances from the ordering. In an embodiment, the API call further specifies an identifier corresponding to a resource selection module 108 of the customer 102 that can process the code specified in the API call. While virtual computer system instances are utilized extensively throughout the present disclosure for the purpose of illustration, it should be noted that the techniques described herein can be performed using other computer system instances (e.g., physical computer system instances, etc.).

In an embodiment, the code specified in the API call corresponds to a particular strategy for executing the commands using the virtual computer system instances 110-112. In an embodiment, the code is provided using a programmatic language that is supported and executable by the resource selection module 108. This code, in an embodiment, provides conditions for selection of virtual computer system instances for execution of the commands in the command document 104. In an embodiment, the customer 102 defines the code such that, in response to execution of the code, the resource selection module 108 selects a first virtual computer system instance 110 for execution of the commands in the command document 104. Once the first virtual computer system instance 110 has executed the commands from the command document 104, the resource selection module 108 can select the other virtual computer system instances 112 from the fleet for execution of the commands. In an embodiment, the code further specifies one or more conditions that are used to determine a time gap between virtual computer system instances executing the commands. In an embodiment, the code, if executed by the resource selection module 108, causes the resource selection module 108 to impose a restriction on execution of the commands by the virtual computer system instances 110-112 such that a second virtual computer system instance 112 cannot be invoked until a period of time has elapsed since the first virtual computer system instance 110 has executed the commands from the command document 104.

In an embodiment, the virtual computer system management service 106 comprises one or more computer systems that each include one or more processors and a memory containing instructions that, if executed by the one or more processors, process incoming requests from customers and transmits commands to virtual computer system instances for execution of a set of commands specified in a command document identified in the request. In an embodiment, the virtual computer system management service 106 is implemented as a process, agent, or other executable code that, if executed, processes incoming requests from customers and transmits commands to virtual computer system instances for execution of the set of commands. In an embodiment, the virtual computer system management service 106 is implemented using other resources of a computing resource service provider (e.g., virtual computer system instances, other computing instances, etc.). In an embodiment, an administrator of the virtual computer system instances 110-112 uses the virtual computer system management service 106 to submit a command document 104 and a set of parameters that control how the command document 104 is applied to the set of virtual computer system instances 110-112. In an embodiment, the command document 104 specifies the commands that are executable by the virtual computer system instances 110-112.

In an embodiment, the set of parameters include a velocity parameter that limits the number of virtual computer system instances to which a set of commands can be concurrently provided for execution. For example, in an embodiment, the commands from the command document 104 are transmitted to the set of virtual computer system instances 110-112 such that no more than a limited number of virtual computer system instances 110-112 are in the process of executing the commands at a given time. In an embodiment, the velocity parameter allows the strict enforcement of an error threshold, and the error threshold limits potential harm caused by executing an errant set of commands using the set of virtual computer system instances 110-112. In an embodiment, if, in the process of set of client virtual computer system instances executing the set of commands, the virtual computer system management service 106 determines that the number of failed command executions meets or exceeds the error threshold, the virtual computer system management service 106 will stop transmitting commands to additional virtual computer system instances. In an embodiment, as the virtual computer system management service 106 identifies failed command execution attempts, the velocity parameter can be reduced to ensure that the number of failed command execution attempts does not exceed the error threshold. In an embodiment, the virtual computer system management service 106 restricts the number of virtual computer systems concurrently executing the set of commands to the lesser of either, the error threshold minus the number of errors that have already occurred, or the velocity parameter.

In an embodiment, the resource selection module 108 is any computing resource, such as a virtual computer system instance, that is configured to execute code and other functions specified in requests from users for selection of virtual computer system instances that are usable to execute a set of commands. In an embodiment, the resource selection module 108 is a container instance configured with a software container that includes code executable (e.g., by the resources associated with the container instance) to perform functions in accordance with techniques described herein. In an embodiment, a "container instance" refers to a computer system instance (virtual or non-virtual, such as a physical computer system running an operating system) that is configured to launch and run software containers. Thus, the resource selection module 108 is configured to run the containers in accordance with the code specified in the API call and in a task definition file provided by an administrator of the resource selection module 108. In an embodiment, the resource selection module 108 is one of many different container instances registered to a cluster, and the other container instances of the cluster are configured to run the same or different types of containers. The container instances within the cluster can be of different instance types or of the same instance type, and the administrator can access more than one cluster. Thus, the administrator, in an embodiment, can launch one or more clusters and then manage customer 102 and application isolation of the containers within each cluster through API calls.

In an embodiment, in response to the API call from the customer 102, the virtual computer system management service 106 determines whether the customer 102 is authorized to execute the commands specified in the command document using the virtual computer system instances 110-112 specified in the API call. In an embodiment, if the virtual computer system management service 106 determines that the customer 102 is not authorized to execute the commands specified in the command document or to utilize the command document, the virtual computer system management service 106 rejects the API call, denying the customer's request. In an embodiment, the virtual computer system management service 106 transmits a request to a policy management service to identify one or more policies applicable to the request from the customer 102. Based at least in part on the policy statements specified in the obtained policies, the virtual computer system management service 106 determines whether the customer 102 is authorized to utilize the specified virtual computer system instances 110-112 to execute the set of commands specified in the command document.

In an embodiment, if the customer 102 is authorized to have the virtual computer system instances 110-112 specified in the API call execute the set of commands in the command document 104, the virtual computer system management service 106 identifies the resource selection module 108 usable to select an invocation target for the set of commands. In an embodiment, the virtual computer system management service 106 identifies the resource selection module 108 from the API call, which specifies an identifier corresponding to the resource selection module 108. The virtual computer system management service 106, in an embodiment, provides the resource selection module 108 with the code generated by the customer 102 and specified in the API call, an identifier corresponding to the command document 104, and the set of virtual computer system instances 110-112 that are to execute the set of commands.

In an embodiment, the resource selection module 108 obtains the command document 104 from a command repository maintained by the virtual computer system management service 106. In an embodiment, the resource selection module 108 executes the code specified in the API call and, based at least in part on the set of virtual computer system instances 110-112 specified by the customer 102, selects a first virtual computer system instance 110 for execution of the commands in the command document 104. In an embodiment, the resource selection module 108 executes the code and takes into account the velocity parameter to determine whether execution of the commands from the command document 104 can be performed at that time. If not, the resource selection module 108 returns an invocation result that specifies a date/time after which the virtual computer system management service 106 can request the resource selection module 108 for another invocation result. In an embodiment, if the invocation result specifies a date/ time after which another request can be made for a new invocation result, the virtual computer system management service 106 adds a message into a delay queue with the message marked as being invisible until the date/time has elapsed. Once the date/time has elapsed, the delay queue makes the message available (e.g., visible), enabling the virtual computer system management service 106 to obtain the message and make another request to the resource selection module 108 for a new invocation result.

In an embodiment, if the resource selection module 108 identifies a virtual computer system instance that can execute the set of commands from the command document 104, the resource selection module 108 provides an invocation result to the virtual computer system management service 106. In an embodiment, the invocation result specifies an identifier corresponding to the virtual computer system instance to which the commands are to be transmitted next for execution. In an embodiment, in response to receiving the invocation result, the virtual computer system management service 106 transmits a request to an instance messaging service to send the set of commands from the command document 104 to the identified virtual computer system instance 110.

In an embodiment, when the virtual computer system instance 110 has executed the set of commands from the command document 104, the virtual computer system instance 110 returns the command output and result code (e.g., success, failure, etc.). In an embodiment, the virtual computer system management service 106 determines whether the commands have been executed by all of the virtual computer system instances 110-112 specified in the API call from the customer 102. If so, the virtual computer system management service 106 returns the command output from the virtual computer system instances to the customer 102, fulfilling the request. However, if the virtual computer system management service 106 determines that commands are to be executed in additional virtual computer system instances, the virtual computer system management service 106 transmits another request to the resource selection module 108 to identify the next virtual computer system instance that is to execute the set of commands. In an embodiment, this new request specifies, in addition to the identifier corresponding to the command document 104 and the set of virtual computer system instances specified by the customer 102, an identifier corresponding to the virtual computer system instance 110 that previously executed the set of commands. In an embodiment, the request further specifies the number of virtual computer system instances that have been sent the set of commands already and the number of virtual computer system instances that have returned each result type (e.g., success, failure, execution timeout, unreachable, etc.). Using the code from the API call and the information specified in this request from the virtual computer system management service 106, the resource selection module 108 either selects the next virtual computer system instance that is to execute the set of commands or a date/time after which the virtual computer system management service 106 can request the resource selection module 108 to select another virtual computer system instance. In this manner, the virtual computer system management service 106 continues to invoke virtual computer system instances from the set of instances defined by the customer 102 for execution of the set of commands in the command document 104. Further, invocation of these virtual computer system instances, in an embodiment, is performed in accordance with the code specified by the customer 102 and executed by the resource selection module 108.

In an embodiment, the API call from the customer 102 specifies an identifier corresponding to an application usable for execution of the code. This application is installed on a computing resource of the customer, such as a virtual computer system instance, a physical computer system, and the like. In an embodiment, the API call specifies an additional API call that can be processed by another computing resource. This additional API call causes the other computing resource to obtain the code and execute the code for selection of a virtual computer system instance for execution of the commands specified in the command document 104.

Figure 2:
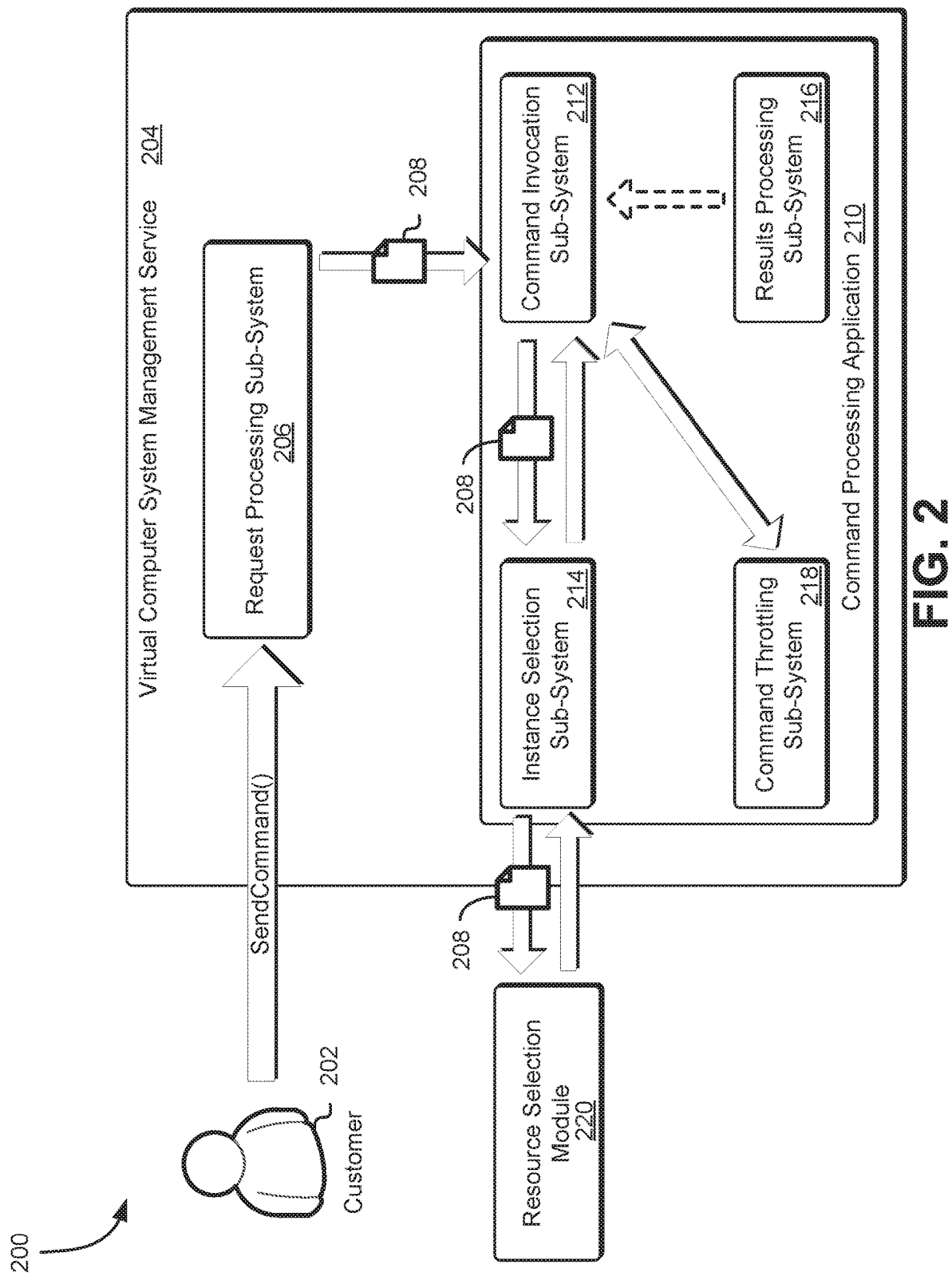
FIG. 2 shows an illustrative example of a system in which a resource selection module selects a virtual computer system instance for execution of one or more commands based at least in part on code specified in an application programming interface call in accordance with an embodiment.

FIG. 2 shows an illustrative example of a system 200 in which a resource selection module 220 selects a virtual computer system instance for execution of one or more commands based at least in part on code specified in an API call from a customer 202 in accordance with an embodiment. In the system 200, a customer 202 submits an API call (e.g., SendCommand( )) to a request processing sub-system 206 of a virtual computer system management service 204 to have one or more virtual computer system instances execute a set of commands specified in a command document 208. In an embodiment, the request processing sub-system 206 is a computer system that provides a frontend interface to customers to enable the customer 202 to submit requests to the virtual computer system management service 204. In an embodiment, the frontend interface is an API that is accessible to the customer 202. In an embodiment, the request processing sub-system 206 is implemented as a process, agent, or other executable code that, if executed, implements the frontend interface. In an embodiment, the request processing sub-system 206 is implemented using other resources of a computing resource service provider (e.g., virtual computer system instances, other computing instances, etc.).

In an embodiment, the API call from the customer 202 specifies an identifier corresponding to a command document 208 that includes the set of commands that are executable by virtual computer system instances. Further, in an embodiment, the API call specifies identifiers corresponding to a set of virtual computer system instances that are to execute the set of commands from the command document 208. In an embodiment, the API call further includes executable code that is usable by a resource selection module 220, provided by an administrator of the virtual computer system instances, to select which virtual computer system instance is to execute the set of commands at a given time. This resource selection module 220 further implements any velocity parameters provided by the administrator of the virtual computer system instances. The API call, in an embodiment, specifies an identifier corresponding to the resource selection module 220 that is to execute the code and provide invocation results for selection of a virtual computer system instance for execution of the set of commands.

In an embodiment, the request processing sub-system 206 evaluates the request from the customer 202 to determine whether the customer 202 is authorized to have the identified set of virtual computer system instances execute the commands specified in the command document 208. In an embodiment, the request processing sub-system 206 obtains, from a policy management service, one or more policies applicable to the request. The one or more policies specify a set of permissions for the customer 202. If the set of permissions specify that the customer 202 is not authorized to utilize the set of virtual computer system instances to execute the commands from the command document 208, the request processing sub-system 206 rejects the request from the customer 202. Similarly, in an embodiment, if the set of permissions specify that the customer 202 is not authorized to utilize the command document 208, the request processing sub-system 206 rejects the request.

If the customer 202 is authorized to have the specified virtual computer system instances execute the commands in the command document 208, the request processing sub-system 206 obtains the command document 208 from a command repository and transmits the API call and the command document 208 to a command processing application 210. In an embodiment, the command processing application 210 is a set of instructions in a memory on a server of the virtual computer system management service 204 that, when executed by processor of the server, implements a set of functional library modules used by the virtual computer system management service 204. In an embodiment, the virtual computer system management service 204 submits work requests to the command processing application 210 via a queue service. In an embodiment, the queue service is a service running on the server or another server accessible by the server. In an embodiment, the queue service receives messages, events, or other queue entries and retains the entries in an ordered list. In an embodiment, the entries are provided on request in a first-in-first-out fashion. In embodiment, the queue service is implemented as a network service that is accessible to the server of the virtual computer system management service 204. In an embodiment, the virtual computer system management service 204 and the command processing application 210 access information about commands, from command documents 208, that are stored in a command repository. In an embodiment, the virtual computer system management service 204 is responsible for handling requests to manage associations. In an embodiment, create, update, and delete APIs update an association table on the command repository, and send association events to the queue service, thereby allowing the command processing application 210 to asynchronously process messages. In an embodiment, query APIs retrieve appropriate tables in the command repository and return results back to the caller.

In an embodiment, the command document 208 and the API call from the customer 202 are provided to a command invocation sub-system 212 of the command processing application 210 by the request processing sub-system 206. In an embodiment, the command invocation sub-system 212 is a module of the command processing application 210 (e.g., a sub-routine of the set of instructions in a memory on the server of the virtual computer system management service 204). The command invocation sub-system 212 evaluates the API call to determine whether a resource selection module 220 is identified within. If a resource selection module 220 is not identified in the API call, the command invocation sub-system 212 submits the API call and the command document 208 to an instance selection sub-system 214 of the command processing application 210 for selection of a virtual computer system instance that is to execute the set of commands. In an embodiment, the instance selection sub-system 214 is a module of the command processing application 210 that, based at least in part on the velocity parameter and other parameters usable for selection of a virtual computer system instance, selects a virtual computer system instance for execution of commands from a command document 208.

In an embodiment, if the API call specifies an identifier of a resource selection module 220, the command invocation sub-system 212 transmits a request to the instance selection sub-system 214 to provide the command document 208, the code specified in the API call, and the target virtual computer system instance set definition from the API call to the resource selection module 220 for processing. In an embodiment, the resource selection module 220 executes the code provided by the customer 202 in the API call and, using the command document 208 and the target virtual computer system instance set definition, selects a virtual computer system instance that is to execute the set of commands from the command document. In an embodiment, the command invocation sub-system 212 obtains, from a command throttling sub-system 218, a velocity parameter usable by the resource selection module 220 to determine the number of virtual computer system instances that can concurrently execute the set of commands. In an embodiment, the velocity parameter is usable to identify a time gap between execution of the commands by distinct virtual computer system instances. In an embodiment, the command throttling sub-system 218 is a module of the command processing application 210 that retrieves velocity parameters corresponding to virtual computer system instances. This parameter can be defined by an administrator of the virtual computer system instances or by the service 204 itself. The command invocation sub-system 212 provides this velocity parameter to the resource selection module 220 via the instance selection sub-system 214. Thus, the resource selection module 220 uses the velocity parameter to determine selection of a virtual computer system instance for execution of the set of commands.

In an embodiment, the resource selection module 220 returns an invocation result that either specifies an identifier of a virtual computer system instance that is to execute the set of commands from the command document 208 or a date/time after which the command invocation sub-system 212 can submit another request, via the instance selection sub-system 214, to the resource selection module 220 to obtain another invocation result. In an embodiment, if the invocation result from the resource selection module 220 specifies a date/time after which the command invocation sub-system 212 can submit another request, the command invocation sub-system 212 adds a message into a delay queue with the message marked as being invisible until the date/time has elapsed. Once the date/time has elapsed, the delay queue makes the message available (e.g., visible), enabling the command invocation sub-system 212 to obtain the message and make another request to the resource selection module 220 for a new invocation result. In an embodiment, the command invocation sub-system 212 periodically queries the queue to identify any messages that are to be processed. Thus, once the message becomes visible, the command invocation sub-system 212 detects presence of the message and submits another request to the resource selection module 220 to obtain a new invocation result.

In an embodiment, if the invocation result specifies an identifier corresponding to a virtual computer system instance, the command invocation sub-system 212 transmits the set of commands from the command document 208 to an instance messaging service for dissemination to the identified virtual computer system instance. In an embodiment, the command output and result code resulting from execution of the set of commands is provided to a results processing sub-system 216 of the command processing application 210. The results processing sub-system 216 is a module of the command processing application 210 that stores results from virtual computer system instances in a command database for use by the request processing sub-system 206 to provide these results to the customer 202. In an embodiment, the request processing sub-system 216 transmits a notification to the command invocation sub-system 212 to transmit the set of commands to the next virtual computer system instance. In an embodiment, the notification causes the command invocation sub-system 212 to transmit another request, via the instance selection sub-system 214, to the resource selection module 220 to select the next virtual computer system instance that is to execute the set of commands. This new request, in an embodiment, specifies the identifier of the last virtual computer system instance that executed the set of commands, as well as the number of instances that have processed the set of commands and the number of instances that have returned each result type.

Figure 3:
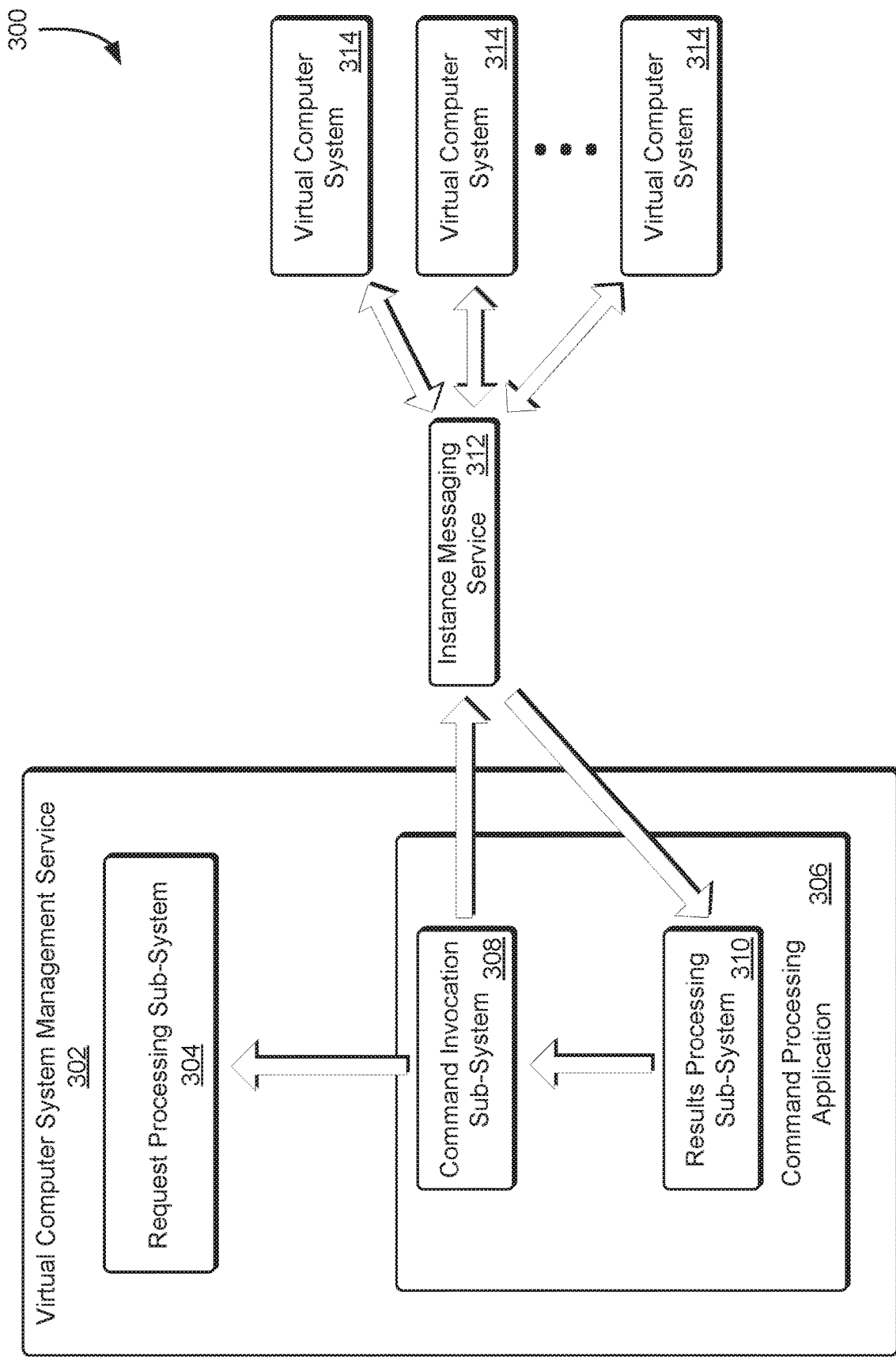
FIG. 3 shows an illustrative example of a system in which a command invocation sub-system of a command processing application transmits one or more commands to virtual computer system instances for execution of the one or more commands in accordance with an embodiment.

FIG. 3 shows an illustrative example of a system 300 in which a command invocation sub-system 308 of a command processing application 306 transmits one or more commands to virtual computer system instances 314 for execution of the one or more commands in accordance with an embodiment. The command invocation sub-system 308 is similar to the command invocation sub-system 212 described above in connection with FIG. 2. Further, the command processing application 306 is similar to the command processing application 210 described above in connection with FIG. 2. In an embodiment, the command invocation sub-system 308 of the command processing application 306 obtains an invocation result from either a resource selection module specified by a customer in its API call or from an instance selection sub-system of the command processing application 306.

In an embodiment, in response to receiving an invocation result that specifies an identifier corresponding to a virtual computer system instance, the command invocation sub-system 308 transmits a request to an instance messaging service 312 to provide the set of commands from the command document to the virtual computer system instance 314. The instance messaging service 312 comprises one or more computer systems and servers that generate signals to other computer programs based at least in part on messages provided by computer systems of the virtual computer system management service 302, such as a computer system that implements the command processing application 306.

In an embodiment, the instance messaging service 312, based at least in part on a message provided by the command invocation sub-system 308, transmits the set of commands from the command document to the virtual computer system instance 314 specified in the message. In response to receiving the set of commands from the instance messaging service 312, the virtual computer system instance 314 executes the set of commands and generates a command output and result code. In an embodiment, the result code specifies whether the set of commands were executed successfully or were not executed successfully due to a failure or an execution timeout. In an embodiment, if the instance messaging service 312 is unable to transmit the set of commands to the virtual computer system instance 314, the instance messaging service 312 generates a result code for the virtual computer system instance 314 that indicates that the instance could not be reached.

In an embodiment, if the virtual computer system instance 314 generates a command output and a result code, the virtual computer system instance 314 transmits the command output and result code to the instance messaging service 312. In response to receiving the command output and result code from the virtual computer system instance 314, the instance messaging service 312 transmits the command output and result code to the results processing sub-system 310 for processing and storage. In an embodiment, if the virtual computer system instance 314 does not provide a response to the instance messaging service 312 (e.g., the instance is unreachable or has become unavailable after submission of the set of commands), the instance messaging service 312 generates a result code that specifies that the virtual computer system instance 314 could not be reached for a response.

In an embodiment, in response to receiving a command output and result code from the instance messaging service 312, the results processing sub-system 310 stores this information in a command database usable by the request processing sub-system 304 to obtain the command results for various virtual computer system instances 314 and to generate a compiled response for a customer of the virtual computer system management service 302. In an embodiment, the results processing sub-system 310 transmits a notification to the command invocation sub-system 308 to indicate that the results processing sub-system 310 has received a command output and result code from the instance messaging service 312 for a particular virtual computer system instance 314. In response to this notification, the command invocation sub-system 308 submits a new request to the resource selection module to obtain another invocation result that specifies the next virtual computer system instance that is to execute the set of commands from the command document.

In an embodiment, the new request to the resource selection module specifies an identifier corresponding to the command document that specifies the commands to be executed by a virtual computer system instance. Additionally, in an embodiment, the new request specifies the target virtual computer system instance set definition from the customer, an identifier of the virtual computer system instance that last returned a command output and result code, the number of virtual computer system instances that have been provided with the set of commands, and the number of virtual computer system instances that have returned each result type. Further, in an embodiment, the new request specifies the code provided by the customer that is usable by the resource selection module to select the next virtual computer system instance that is to execute the set of commands. In an embodiment, the resource selection module returns the identifier of the next virtual computer system service that is to execute the set of commands. The command invocation sub-system 308, based at least in part on this response from the resource selection module, transmits a new request to the instance messaging service 312 to transmit the set of commands to the newly identified virtual computer system instance.

In an embodiment, if the command invocation sub-system 308 determines that execution of the commands has been completed by the set of virtual computer system instances specified in the API call from the customer, the command invocation sub-system 308 transmits a notification to the request processing sub-system 304 to indicate that the command results can be obtained. This notification, in an embodiment, causes the request processing sub-system 304 to obtain the command results from the command database and to use these command results to compile a response to the customer's API call. In an embodiment, if the command invocation sub-system 308 determines, based at least in part on the result codes obtained from virtual computer system instances that have executed the set of commands, that an error threshold has been met, the command invocation sub-system 308 foregoes transmitting additional invocation requests to the resource selection module and provides a notification to the request processing sub-system 304 indicating that execution of the commands was unsuccessful.

Figure 4:
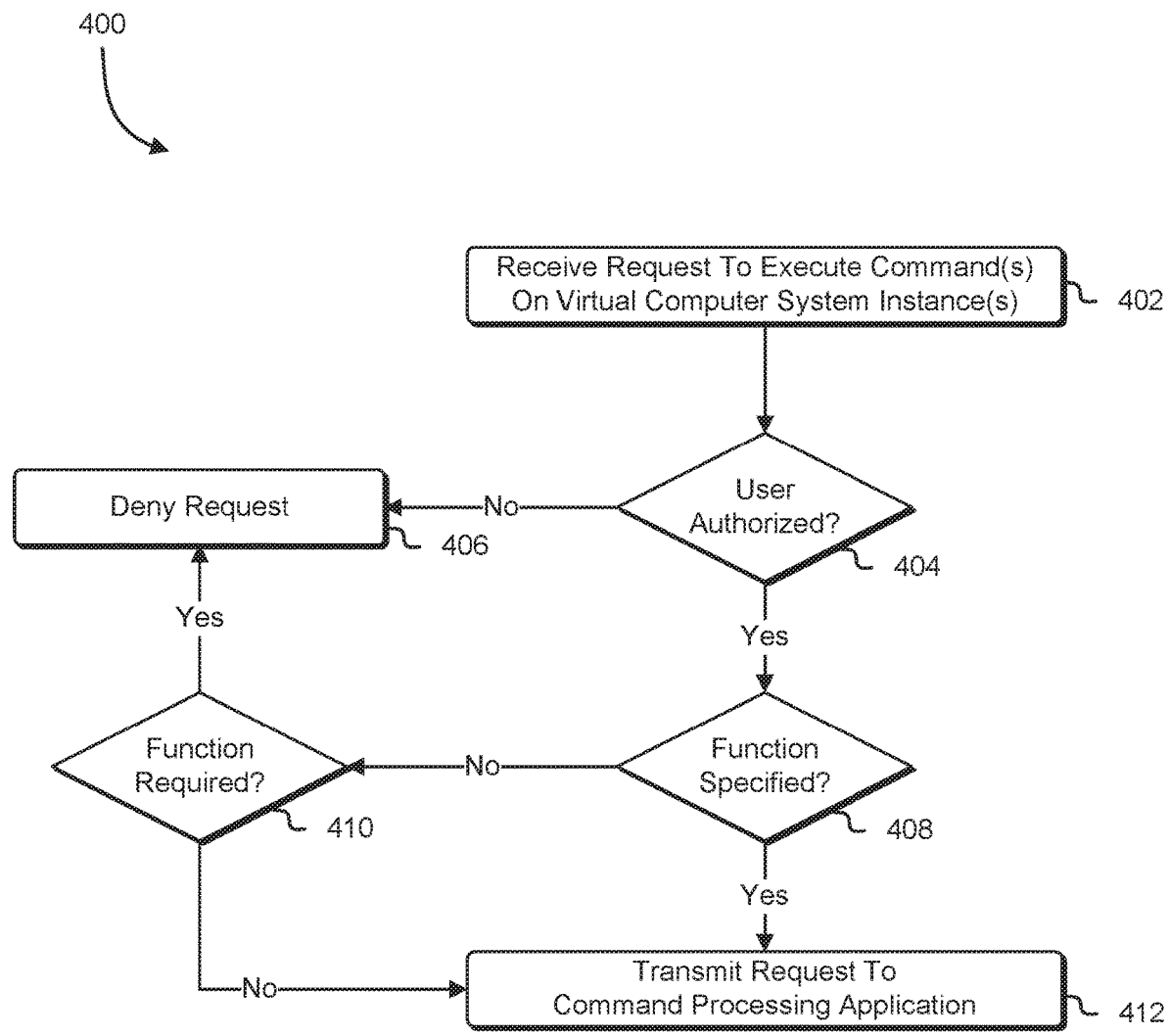
FIG. 4 shows an illustrative example of a process for transmitting a request for execution of one or more commands specified in a command document to a command processing application in accordance with an embodiment.

FIG. 4 shows an illustrative example of a process 400 for transmitting a request for execution of one or more commands specified in a command document to a command processing application in accordance with an embodiment. In an embodiment, the process 400 is performed by a request processing sub-system of the virtual computer system management service. The request processing sub-system is configured to receive API calls (e.g., requests) from customers of the virtual computer system management service and process the API calls in accordance with policies applicable to the request.

In an embodiment, the request processing sub-system receives a request 402 from a customer or other entity to execute one or more commands on a set of virtual computer system instances. In an embodiment, the request is an API call to the request processing sub-system. The API call, in an embodiment, specifies an identifier corresponding to a command document that specifies a set of commands executable by virtual computer system instances owned by a resource administrator (e.g., employer of the customer, etc.). In an embodiment, the API call further specifies a target set of virtual computer system instances that are to execute the set of commands specified in the command document. This target set of virtual computer system instances can be identified via an identifier corresponding to each instance or a metadata tag usable by the virtual computer system management service to identify the set of virtual computer system instances. In an embodiment, the API call specifies code that is usable to implement a strategy for execution of the commands and for generating an ordering of the set of virtual computer system instances, as well as other conditions for selection of the virtual computer system instances from the ordering. In an embodiment, the API call further specifies an identifier corresponding to a resource selection module of the customer that can process the code specified in the API call.

In an embodiment, the request processing sub-system evaluates the API call to determine 404 if the customer that submitted the API call is authorized to have the selected virtual computer system instances execute the commands specified in the command document. In an embodiment, the request processing sub-system transmits the API call to a policy management service, which can identify one or more access control policies usable to determine whether the customer is authorized to have these commands executed on its behalf. In an embodiment, if the customer is not authorized to have these commands executed by the virtual computer system instances on its behalf, the request processing sub-system will deny 406 the request from the customer.

In an embodiment, if the user is authorized to have the selected virtual computer system instances execute the commands specified in the command document, the request processing sub-system determines 408 whether an identifier corresponding to a resource selection module is specified in the API call. If the API call does not specify an identifier corresponding to a resource selection module, the request processing sub-system determines 410 whether a resource selection module is required for execution of the code specified in the API call. In an embodiment, the request processing sub-system receives a policy from the policy management service that specifies that a resource selection module is required to execute code specified in the API call. Thus, if the API call includes code executable by a resource selection module but does not include an identifier of a resource selection module, the request processing sub-system will deny 406 the request. In an embodiment, if the request processing sub-system determines that the code specified in the API call cannot be executed using the instance selection sub-system, and the API call does not specify an identifier of a resource selection module, the request processing sub-system will also deny 406 the request.

In an embodiment, if the request processing sub-system determines that an identifier of a resource selection module is not required or that the API call does include an identifier of a resource selection module that can execute the code specified in the API call, the request processing sub-system transmits 412 the request to the command processing application for processing. This enables the command processing application to provide the identified command document, target virtual computer system instance set definition, and the code to a resource selection module for processing and selection of a first virtual computer system instance for execution of the set of commands.

Figure 5:
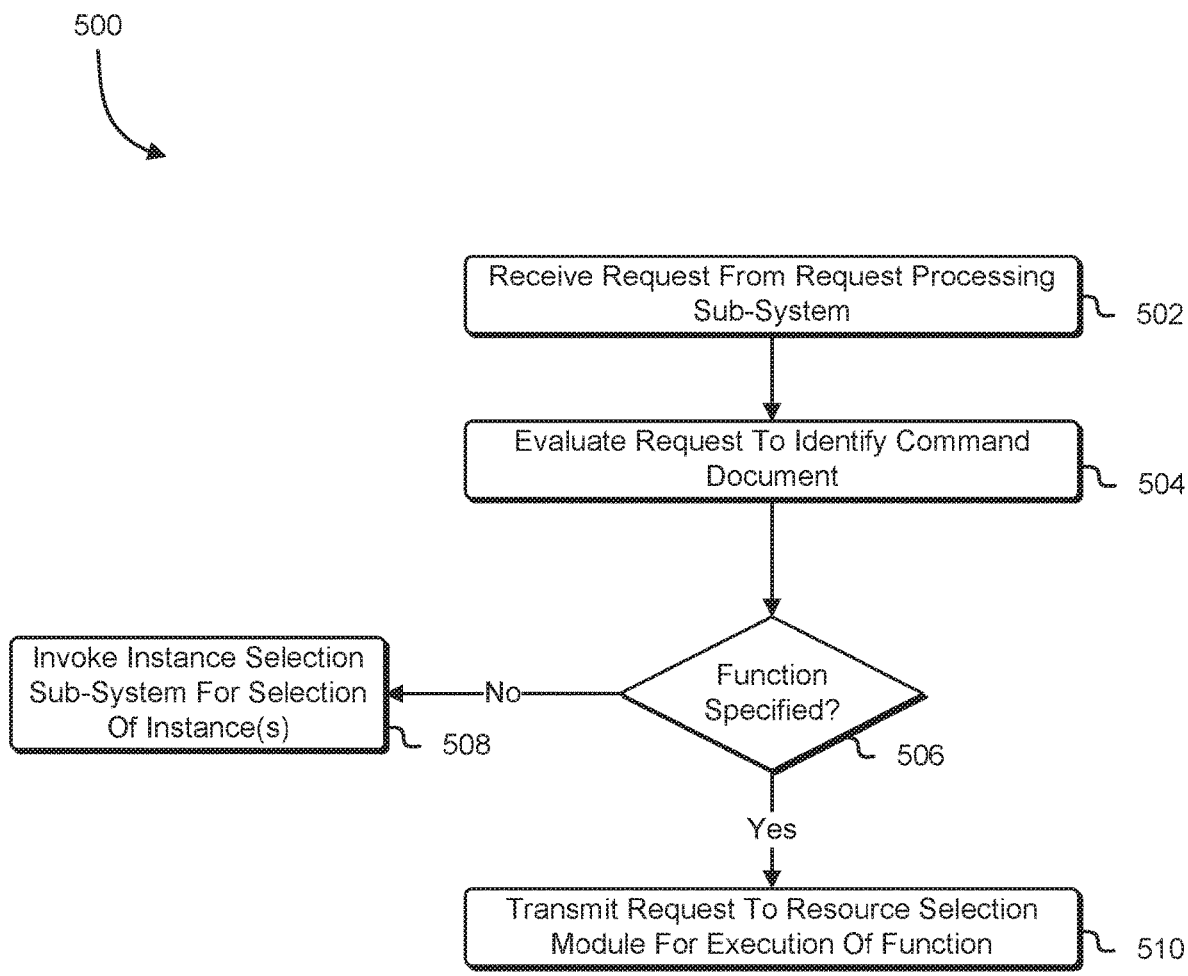
FIG. 5 shows an illustrative example of a process for providing a command document to a specified resource selection module or to an instance selection sub-system for selection of a virtual computer system instance for execution of one or more commands in accordance with an embodiment.

FIG. 5 shows an illustrative example of a process 500 for providing a command document to a specified resource selection module or to an instance selection sub-system for selection of a virtual computer system instance for execution of one or more commands in accordance with an embodiment. The process 500 is performed by a computer system, an application installed on a computer system, or a module of an application, such as the command invocation sub-system of the command processing application. In an embodiment the command invocation sub-system submits requests to a resource selection module or to the instance selection sub-system to identify the next virtual computer system instance that is to execute the set of commands specified in the command document identified by the customer and specified in the API call.

In an embodiment, the command invocation sub-system receives 502 the request (e.g., API call) from the request processing sub-system. As noted above, the request specifies an identifier corresponding to a command document that specifies a set of commands executable by virtual computer system instances owned by a resource administrator (e.g., employer of the customer, etc.). In an embodiment, the API call further specifies a target set of virtual computer system instances that are to execute the set of commands specified in the command document. This target set of virtual computer system instances can be identified via an identifier corresponding to each instance or a metadata tag usable by the virtual computer system management service to identify the set of virtual computer system instances. In an embodiment, the API call specifies code that is usable to implement a strategy for execution of the commands and for generating an ordering of the set of virtual computer system instances, as well as other conditions for selection of the virtual computer system instances from the ordering. In an embodiment, the API call further specifies an identifier corresponding to a resource selection module of the customer that can process the code specified in the API call.

In an embodiment, the command invocation sub-system evaluates 504 the request to identify the command document that specifies the set of commands that are to be executed by the virtual computer system instances specified in the request. In an embodiment, the command invocation sub-system uses the identifier of the command document to locate the command document from a command repository and obtains the command document from the command repository. In an embodiment, the command invocation sub-system uses the identifier corresponding to the command document as input to a new request that is provided to the resource selection module or the instance selection sub-system to enable the resource selection module or the instance selection sub-system to obtain the command document and use the commands specified therein to select the next virtual computer system instance that will execute the commands.

In an embodiment, the command invocation sub-system further evaluates the request to determine 506 whether the request specifies an identifier corresponding to a resource selection module. In an embodiment, the resource selection module is provided by the customer or other entity that manages the virtual computer system instances that are to execute the set of commands from the command document. This resource selection module is configured to execute code specified in the API call usable to select a virtual computer system instance for execution of the set of commands from the command document. In an embodiment, the API call does not specify an identifier of a resource selection module and does not include code that can be executed using a resource selection module. If the request does not specify the identifier of a resource selection module, the command invocation sub-system invokes 508 an instance selection sub-system for selection of a virtual computer system instance from the target virtual computer system instance set definition specified in the API call. In an embodiment, the command invocation sub-system transmits the identifier corresponding to the command document and the target virtual computer system instance set definition to the instance selection sub-system to enable the instance selection sub-system to select a virtual computer system instance.

In an embodiment, if the API call specifies an identifier of a resource selection module, the command invocation sub-system transmits 510 a request to the resource selection module to select a virtual computer system instance for execution of the commands specified in the command document. In an embodiment, the request includes the command document, the code specified in the API call, and the target virtual computer system instance set definition from the API call. In an embodiment, the resource selection module executes the code provided by the customer in the API call and, using the command document and the target virtual computer system instance set definition, selects a virtual computer system instance that is to execute the set of commands from the command document. In an embodiment, the command invocation sub-system obtains, from a command throttling sub-system, a velocity parameter usable by the resource selection module to determine the number of virtual computer system instances that can concurrently execute the set of commands. The command invocation sub-system provides this velocity parameter to the resource selection module, enabling the resource selection module to use the velocity parameter to determine selection of a virtual computer system instance for execution of the set of commands.

Figure 6:
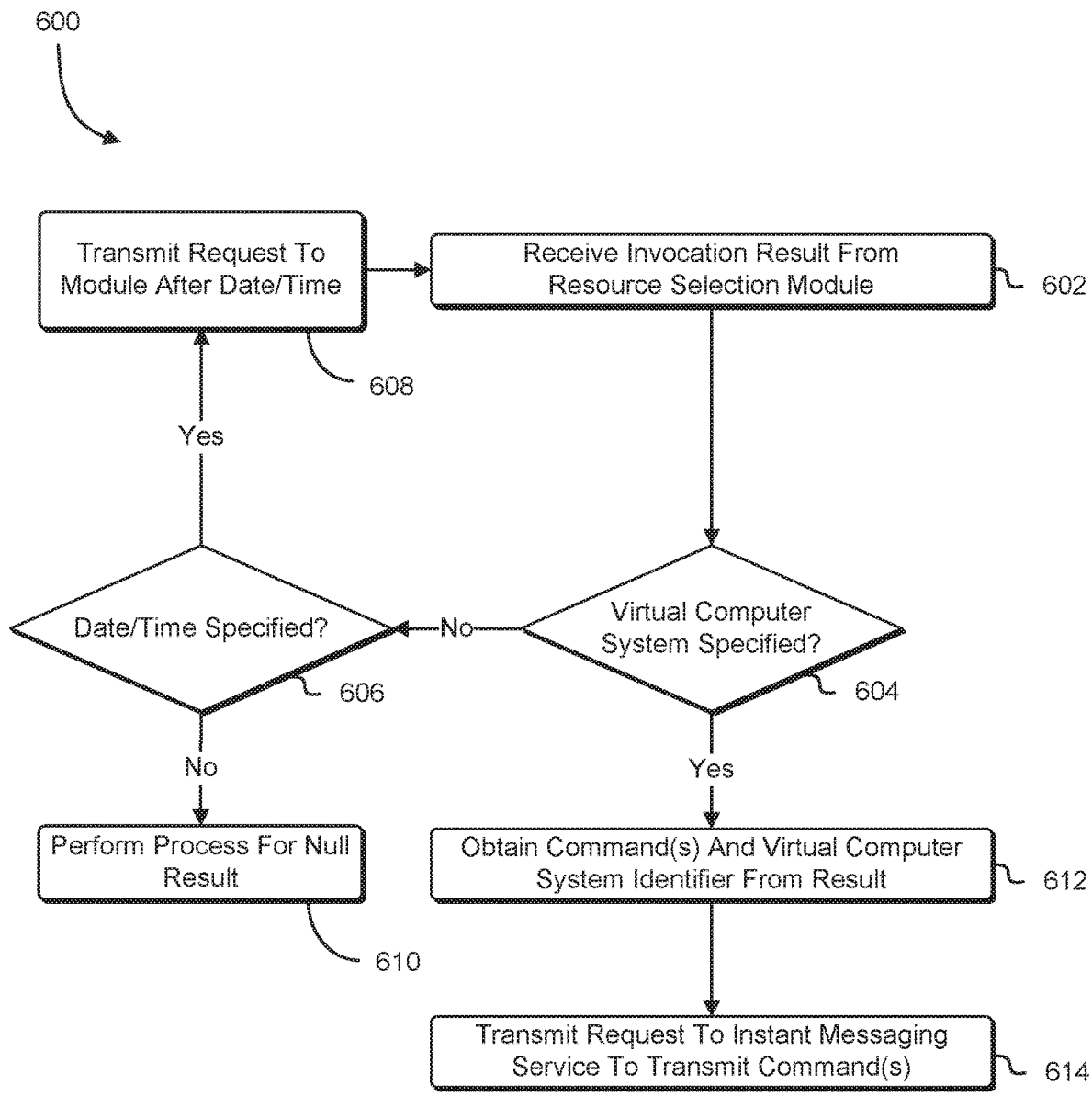
FIG. 6 shows an illustrative example of a process for transmitting one or more commands to a virtual computer system instance in response to receiving an invocation result from a resource selection module in accordance with an embodiment.

FIG. 6 shows an illustrative example of a process 600 for transmitting one or more commands to a virtual computer system instance in response to receiving an invocation result from a resource selection module in accordance with an embodiment. The process 600 is performed by a computer system, an application installed on a computer system, or a module of an application, such as the command invocation sub-system of the command processing application. In an embodiment, the process 600 is performed by the command invocation sub-system in response to receiving an invocation result from either the resource selection module or the instance selection sub-system of the command processing application. In an embodiment, the command invocation sub-system receives 602 an invocation result from the resource selection module. As noted above, the command invocation sub-system submits a request to the resource selection module to obtain an invocation result that specifies either an identifier corresponding to a virtual computer system instance that is to execute the set of commands from the command document or a date/time after which the command invocation sub-system is to submit a new request to the resource selection module to obtain a new invocation result. It should be noted that while FIG. 6 illustrates that the invocation result is obtained from the resource selection module, in an embodiment, the invocation result can be provided by the instance selection sub-system. In an embodiment, if the API call from the customer does not specify an identifier of a resource selection module and/or does not include custom code executable by a resource selection module, the command invocation sub-system transmits the request to the instance selection sub-system for selection of a virtual computer system instance for execution of the commands in the command document.

In an embodiment, in response to receiving the invocation result from the resource selection module, the command invocation sub-system determines 604 whether the invocation result specifies an identifier corresponding to a virtual computer system instance that is to execute the commands in the command document. In an embodiment, if the invocation result does not specify an identifier of a virtual computer system instance, the command invocation sub-system determines 606 whether the invocation result specifies a date/time after which the command invocation sub-system can submit a new request to the resource selection module to obtain a new invocation result. In an embodiment, if the invocation result does not specify a date/time, the command invocation sub-system performs 610 a process corresponding to a null result from the resource selection module. The process includes transmitting a notification to the request processing sub-system of the virtual computer system management service to indicate that an error has been encountered in the execution of the set of commands from the command document. Alternatively, in an embodiment, the process includes submitting a new request to the resource selection module once a predetermined period of time has elapsed. This predetermined period of time is defined by the virtual computer system management service or by the customer via the API call. In an embodiment, the command invocation sub-system omits the code from the API call and submits a request to the instance selection sub-system to obtain an alternative invocation result.

In an embodiment, if the invocation result from the resource selection module specifies a date/time, the command invocation sub-system transmits 608 a new request to the resource selection module after the date/time has elapsed. In an embodiment, the command invocation sub-system adds a message into a delay queue with the message marked as being invisible until the date/time has elapsed. In an embodiment, the command invocation sub-system evaluates the delay queue to obtain messages for processing. Since the message is made to be invisible during the date/time, the message cannot be obtained by the command invocation sub-system until the date/time has elapsed. Once the date/time has elapsed, the delay queue makes the message available (e.g., visible), enabling the command invocation sub-system to obtain the message and make another request to the resource selection module for a new invocation result.

In an embodiment, if the invocation result specifies an identifier of a virtual computer system instance that is to execute the set of commands, the command invocation sub-system obtains 612 the set of commands from the command document and the uses the identifier from the invocation result to identify the virtual computer system instance that is to execute the set of commands. Using the obtained set of commands and information regarding the selected virtual computer system instance, the command invocation sub-system generates a request for the selected virtual computer system instance to execute the set of commands and to provide a command output resulting from execution of the set of commands. In an embodiment, the command invocation sub-system transmits 614 the request to an instance messaging service for delivery to the selected virtual computer system instance. Alternatively, in an embodiment, the command invocation sub-system transmits the request directly to the selected virtual computer system instance.

Figure 7:
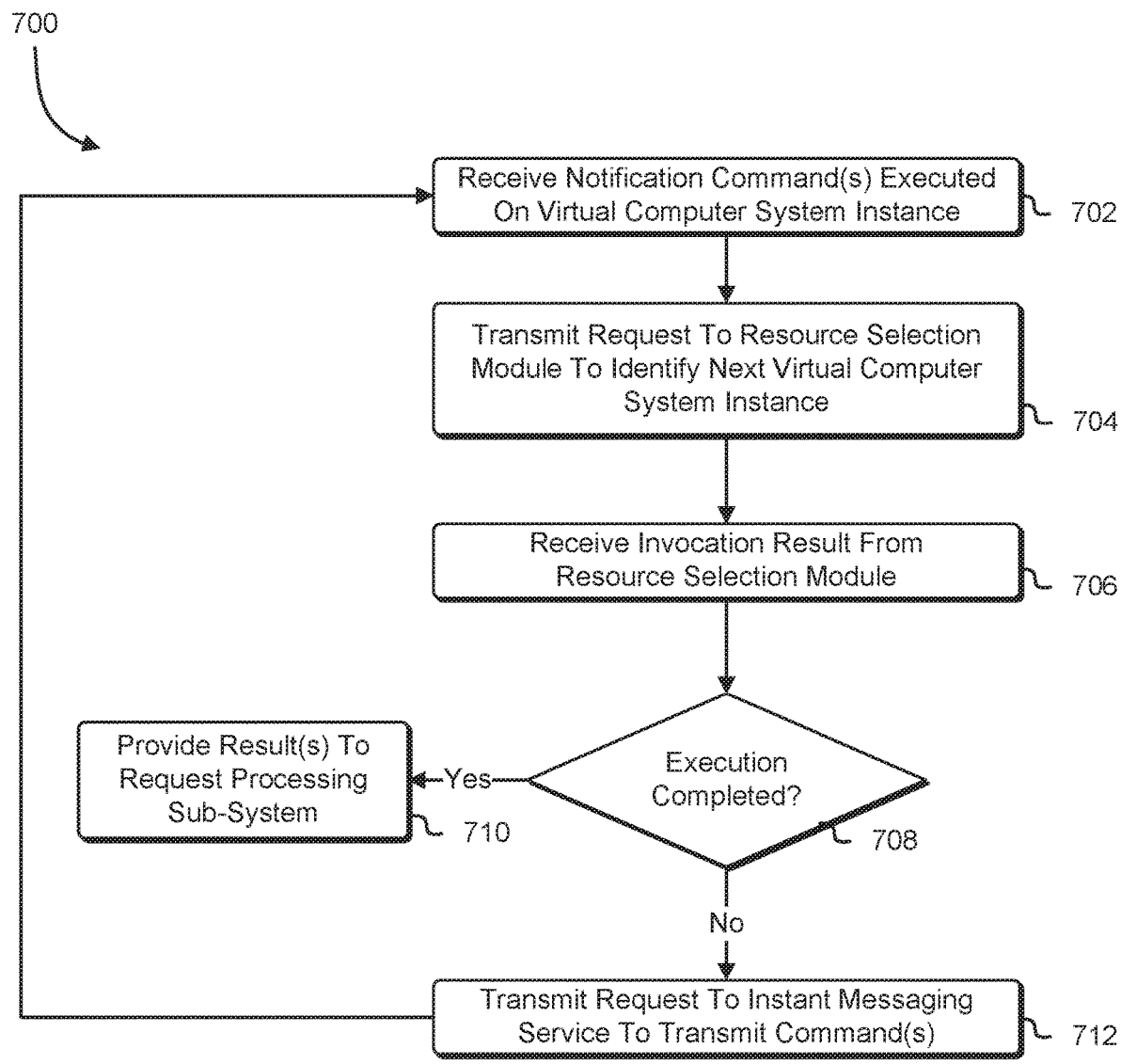
FIG. 7 shows an illustrative example of a process for transmitting one or more commands to virtual computer system instances according invocation results from a resource selection module in accordance with an embodiment.

FIG. 7 shows an illustrative example of a process 700 for transmitting one or more commands to virtual computer system instances according invocation results from a resource selection module in accordance with an embodiment. The process 700 is performed by a computer system, an application installed on a computer system, or a module of an application, such as the command invocation sub-system, which processes command outputs and result codes from virtual computer system instances that have either processed the commands from a command document or have otherwise returned a response indicating that the commands could not be executed successfully. In an embodiment, the command output and result code resulting from execution of the set of commands by a virtual computer system instance is provided to a results processing sub-system of the command processing application. The results processing sub-system stores the results from the virtual computer system instance in a command database for use by the request processing sub-system of the virtual computer system management service to provide these results to the customer. In an embodiment, the request processing sub-system transmits a notification to the command invocation sub-system to transmit the set of commands to the next virtual computer system instance. This notification also specifies the command output and the result code from the virtual computer system instance. In an embodiment, the command invocation sub-system receives 702 this notification from the results processing sub-system regarding the set of commands executed by a virtual computer system instance.

In an embodiment, the command invocation sub-system transmits 704 a new request to the resource selection module to identify the next virtual computer system instance that is to execute the set of commands from the command document. In an embodiment, the new request specifies the target virtual computer system instance set definition originally obtained from the API call submitted by the customer, an identifier of the virtual computer system instance that last returned a command output and result code, the number of virtual computer system instances that have been provided with the set of commands, and the number of virtual computer system instances that have returned each result type. Further, in an embodiment, the new request specifies the code provided by the customer that is usable by the resource selection module to select the next virtual computer system instance that is to execute the set of commands.

In an embodiment, the resource selection module executes the code specified in the request and, based at least in part on the information provided by the command invocation sub-system, identifies the next virtual computer system instance that is to execute the set of commands. In an embodiment, if the information provided by the command invocation sub-system leads to a determination that an error threshold has been reached, the resource selection module returns an invocation result indicating that further execution of the commands cannot be performed. This can be represented via a null result or via a notification that indicates that the error threshold has been reached. In an embodiment, if the through execution of the code the resource selection module determines that a period of time is to elapse before the commands can be executed on another virtual computer system instance, the resource selection module returns an invocation result that specifies a date/time after which the command invocation sub-system can submit another request to the resource selection module for a new invocation result. The command invocation sub-system thus receives 706 the invocation result from the resource selection module.

In an embodiment, the command invocation sub-system evaluates the invocation result to determine 708 whether execution of the set of commands has been completed by the virtual computer system instances associated with the target virtual computer system instance set definition originally obtained from the API call submitted by the customer. In an embodiment, if the invocation results includes an indication that the set of commands have been executed by the virtual computer system instances associated with the target virtual computer system instance set definition, the command invocation sub-system provides 710 the command output and the result codes from the virtual computer system instances to the request processing sub-system of the virtual computer system management service for compilation and dissemination to the customer. Similarly, in an embodiment, if the invocation result includes an indication that an error threshold has been reached resulting in commands not being executable by additional virtual computer system instances, the command invocation sub-system provides the command output and result codes from the virtual computer system instances that provided this information. Further, the command invocation sub-system transmits a notification to the request processing sub-system to indicate that the error threshold has been reached, resulting in the set of commands not being executed by all the virtual computer system instances associated with the target virtual computer system instance set definition.

In an embodiment, if the invocation result specifies an identifier of a virtual computer system instance that is to execute the set of commands, the command invocation sub-system determines that execution of the set of commands has not been completed by the virtual computer system instances associated with the target virtual computer system instance set definition. Using the set of commands and information regarding the selected virtual computer system instance, the command invocation sub-system generates a request for the selected virtual computer system instance to execute the set of commands and to provide a command output resulting from execution of the set of commands. In an embodiment, the command invocation sub-system transmits 712 the request to an instance messaging service for delivery to the selected virtual computer system instance. In an embodiment, the command execution sub-system awaits a new notification from the results processing sub-system indicating the command output and result code from this virtual computer system instance. In this manner, the command invocation sub-system continues to transmit requests to virtual computer system instances to execute the set of commands and to process output from these virtual computer system instances to determine whether execution of the commands is completed successfully or if an error threshold has been reached, resulting in failure to fully execute the set of commands.

Figure 8:
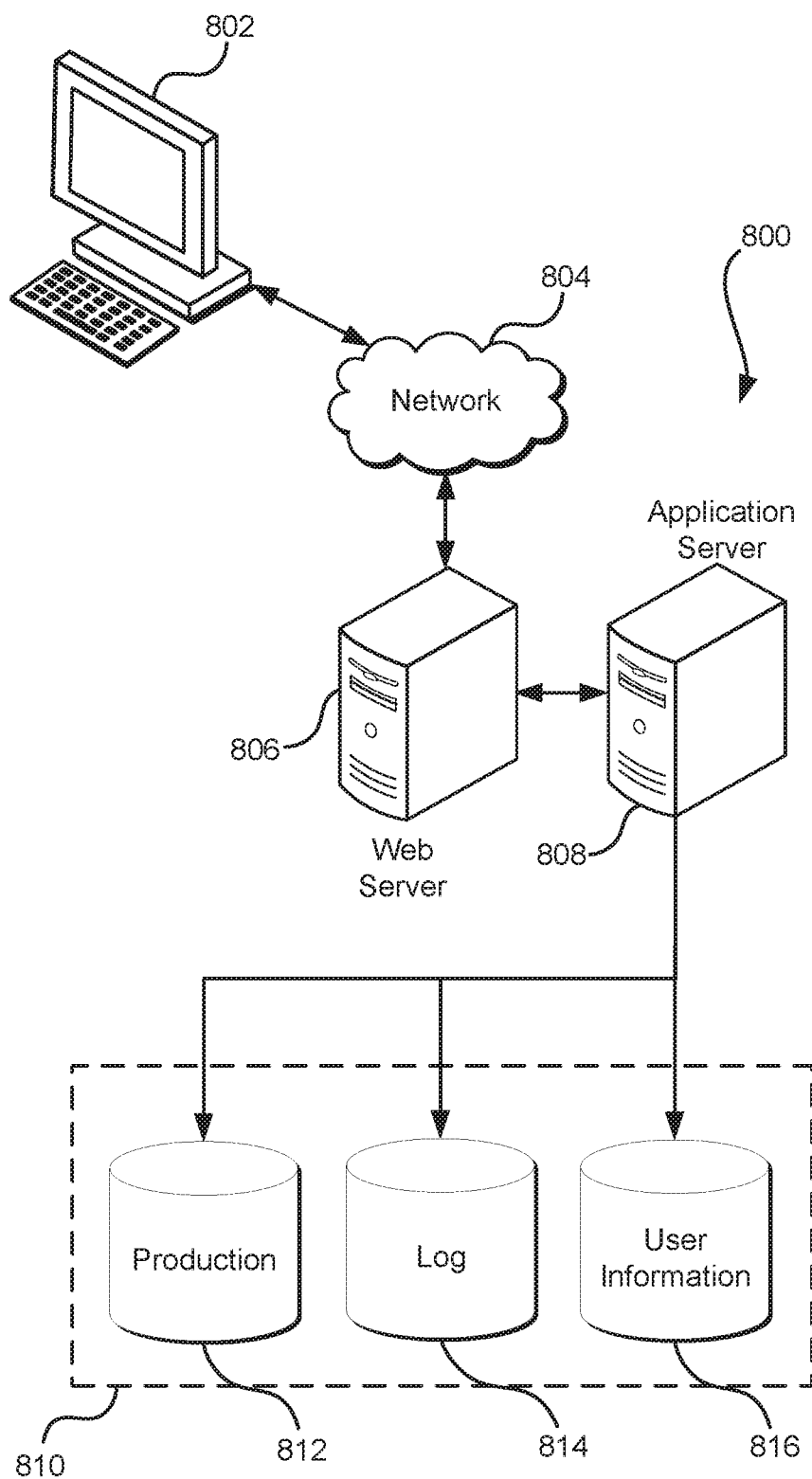
FIG. 8 shows an illustrative example of a system in which an embodiment can be implemented.

FIG. 8 illustrates aspects of an example system 800 for implementing aspects in accordance with an embodiment. As will be appreciated, although a web-based system is used for purposes of explanation, different systems may be used, as appropriate, to implement an embodiment. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computer system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The an embodiment further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and nonremovable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the an embodiment.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, on behalf of a web-based service, a request to execute a command on a plurality of computer systems, the request identifying:
      the command to be executed by the web-based service;
      a set of parameters that specifies the plurality of computer systems, wherein the set of parameters includes a velocity parameter that limits a number of computer systems that can concurrently execute the command; and
      a function to select, from the plurality of computer systems, a set of computer systems on which to execute the command;
   launching the function, with the set of parameters identified in the request as input, to select the set of computer systems in accordance with the velocity parameter to perform the command;
   causing the set of computer systems selected to execute the command; and
   providing a result of executing the command in response to the request.

2. The computer-implemented method of claim 1, wherein:
   the request further includes an identifier identifying a container including executable code that, if executed, launches the function; and
   executing the function further comprises causing, based at least on the identifier, a computing resource associated with the container to launch the function, by at least transmitting the request to the computing resource.

3. The computer-implemented method of claim 2, wherein the method further comprises causing the computing resource to forward the request to the set of computer systems selected to cause execution of the command.

4. The computer-implemented method of claim 1, wherein the method further comprises:
   receiving an indication that a subset of the set of computer systems could not execute the command; and
   as a result of a quantity of computer systems of the subset exceeding a predetermined value, transmitting a notification indicating that the command did not execute successfully.

5. A system, comprising:
   one or more processors; and
   memory to store computer-executable instructions that, if executed, cause the one or more processors to:
      receive input from a user, the input comprising:
         one or more operations to be performed by a web-based service;
         at least one indication of one or more resources to be used in performing the one or more operations;
         a parameter indicating a limit on a number of computer systems to which the one or more operations may be provided for concurrent execution;
         a function executable to select from the one or more resources; and
         control information to control the one or more resources to perform the one or more operations;
      execute the function to select at least one of the one or more resources in accordance with the limit to perform the one or more operations according to the control information;
      perform the one or more operations using the one or more resources; and
      cause a result of performing the one or more operations to be provided to the user.

6. The system of claim 5, wherein:
   the input further specifies an identifier of a function executable in a computing instance to select the one or more resources based at least in part on the at least one indication; and
   the computer-executable instructions further cause the one or more processors to transmit the input to the computing instance to select the one or more resources according to the function.

7. The system of claim 5, wherein the input is an application programming interface call specifying the one or more operations, the at least one indication, and the control information.

8. The system of claim 5, wherein:
   the at least one indication includes a target set definition usable to determine the one or more resources; and
   the computer-executable instructions further cause the one or more processors to utilize the target set definition to identify the one or more resources.

9. The system of claim 5, wherein the one or more resources are virtual computer system instances.

10. The system of claim 5, wherein the result specifies whether performance of the one or more operations was completed successfully.

11. The system of claim 5, wherein:
   the input specifies an identifier corresponding to a document specifying the one or more operations; and
   the computer-executable instructions further cause the one or more processors to utilize the identifier corresponding to the document to obtain the document.

12. The system of claim 5, wherein the computer-executable instructions further cause the one or more processors to:

receive an output from the one or more resources, the output specifying that execution of the one or more operations could not be completed;

terminate transmission of the one or more operations to other resources; and transmit a notification indicating that the execution of the one or more operations could not be completed by the one or more resources.

13. A non-transitory computer-readable storage medium having stored thereon executable instructions that, as a result of being executed by one or more processors of a computer system, cause the computer system to at least:

receive input from a user, the input comprising:
one or more operations to be performed by a web-based service;
at least one indication of one or more resources to be used in performing the one or more operations;
a constraint on a number of the one or more resources that are allowed to concurrently perform the one or more operations;
executable code operative to select a subset of the one or more resources; and
control information to control the one or more resources to perform the one or more operations;

determine, at least in part as a result of execution of the executable code, at least one of the one or more resources to perform the one or more operations according to the control information;

perform, in accordance with the constraint, the one or more operations using the one or more resources; and cause a result of performing the one or more operations to be provided to the user.

14. The non-transitory computer-readable storage medium of claim 13, wherein the result specifies successful performance of the one or more operations.

15. The non-transitory computer-readable storage medium of claim 13, wherein:

the result indicates that the one or more operations were not performed successfully; and the executable instructions further cause the computer system to:

determine, based at least in part on the result, whether a threshold has been reached; and as a result of the threshold being reached, provide a notification indicating failure to execute the one or more operations by the one or more resources.

16. The non-transitory computer-readable storage medium of claim 13, wherein the input is an application programming interface call.

17. The non-transitory computer-readable storage medium of claim 13, wherein:

the input further specifies an identifier corresponding to a document, the document specifying the one or more operations; and the executable instructions further cause the computer system to:

utilize the identifier to obtain the document from a repository of documents; and obtain, from the document, the one or more operations for performance by the one or more resources.

18. The non-transitory computer-readable storage medium of claim 13, wherein:

the input further specifies an identifier of another resource on which to execute an operation associated with the control information; and the executable instructions further cause the computer system to:

utilize the identifier of the another resource to identify the another resource; and transmit a request to the another resource to perform the operation, the request including the control information, the at least one indication, and the one or more operations.

19. The non-transitory computer-readable storage medium of claim 13, wherein the one or more resources comprise a set of virtual computer system instances.

20. The non-transitory computer-readable storage medium of claim 13, wherein:

the input specifies a target set definition usable to determine the one or more resources; and the executable instructions further cause the computer system to utilize the target set definition to identify the one or more resources.

* * * * *